US010104868B2

(12) United States Patent
Barney

(10) Patent No.: US 10,104,868 B2
(45) Date of Patent: Oct. 23, 2018

(54) LIVESTOCK FEEDER WITH MEASURED DISPENSING SYSTEM

(71) Applicant: Dave Barney, Reedsburg, WI (US)

(72) Inventor: Dave Barney, Reedsburg, WI (US)

( * ) Notice: Subject to any disclaimer, the term of this patent is extended or adjusted under 35 U.S.C. 154(b) by 264 days.

(21) Appl. No.: 15/184,535

(22) Filed: Jun. 16, 2016

(65) Prior Publication Data

US 2017/0360001 A1 Dec. 21, 2017

(51) Int. Cl.
*A01K 5/02* (2006.01)
*A01K 5/01* (2006.01)
*A01K 29/00* (2006.01)

(52) U.S. Cl.
CPC ............. *A01K 5/0225* (2013.01); *A01K 5/01* (2013.01); *A01K 5/0275* (2013.01); *A01K 29/005* (2013.01)

(58) Field of Classification Search
CPC ... A01K 5/0225; A01K 5/0275; A01K 5/0291
See application file for complete search history.

(56) References Cited

U.S. PATENT DOCUMENTS

| 4,284,035 | A | 8/1981 | White |
| 4,353,329 | A | 10/1982 | Thibault |
| 4,981,107 | A | 1/1991 | Beaudoin et al. |
| 5,069,164 | A | 12/1991 | Wiwi |
| 5,906,174 | A | 5/1999 | Muldoon |
| 6,199,511 | B1 | 3/2001 | Thibault |
| 6,427,628 | B1* | 8/2002 | Reece ................. A01K 5/0291 119/51.11 |
| 6,868,801 | B2 | 3/2005 | Rovira Badia et al. |
| 7,007,633 | B2 | 3/2006 | Dodds |
| 8,132,538 | B1 | 3/2012 | Schick et al. |
| 9,560,834 | B2* | 2/2017 | Ma ........................ A01K 5/0225 |
| 2010/0095895 | A1* | 4/2010 | Laliberta ............... A01K 5/0275 119/56.1 |
| 2010/0162960 | A1 | 7/2010 | Moon |
| 2012/0085288 | A1 | 4/2012 | Salinas et al. |
| 2014/0345534 | A1 | 11/2014 | Rhee et al. |

* cited by examiner

*Primary Examiner* — Monica L Williams
(74) *Attorney, Agent, or Firm* — Boyle Fredrickson S.C.

(57) ABSTRACT

A livestock feeder is provided with a feed discharge assembly for dispensing a premeasured amount of feed into the trough of each feeding stall. The livestock feeder includes individual feeding stalls wherein the same amount of feed is dispensed for each animal such that the feeding of each animal may be monitored and controlled. Indicator lights may be provided to attract the livestock to the individual feeding stalls during feeding periods.

20 Claims, 9 Drawing Sheets

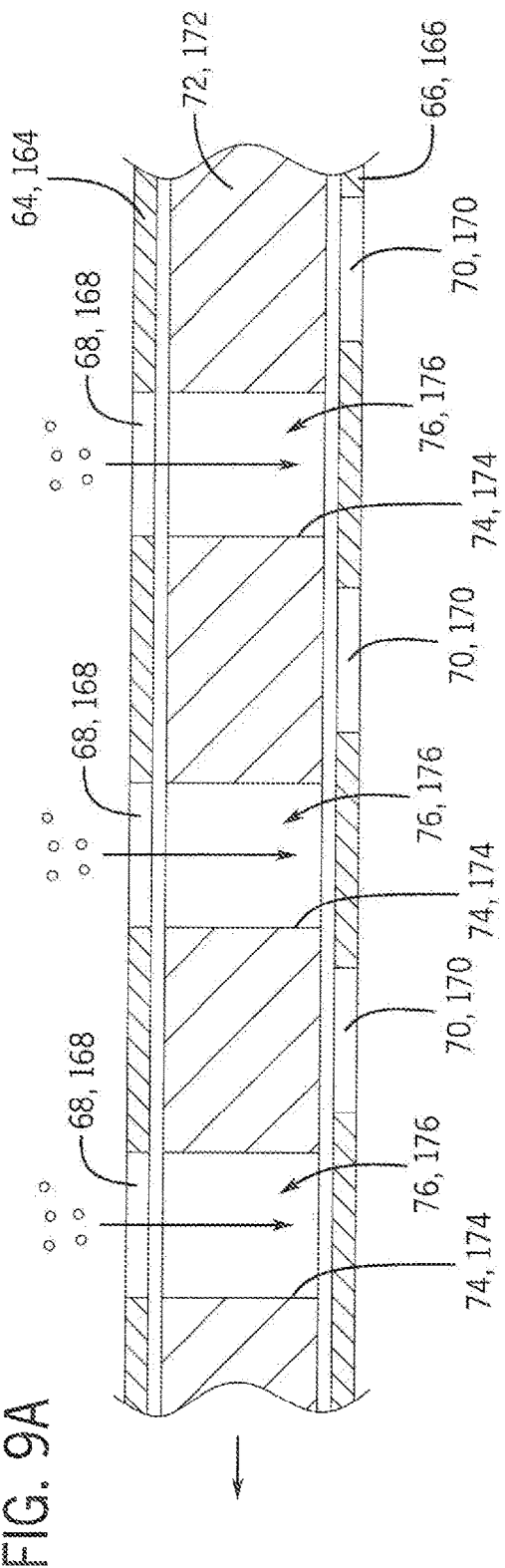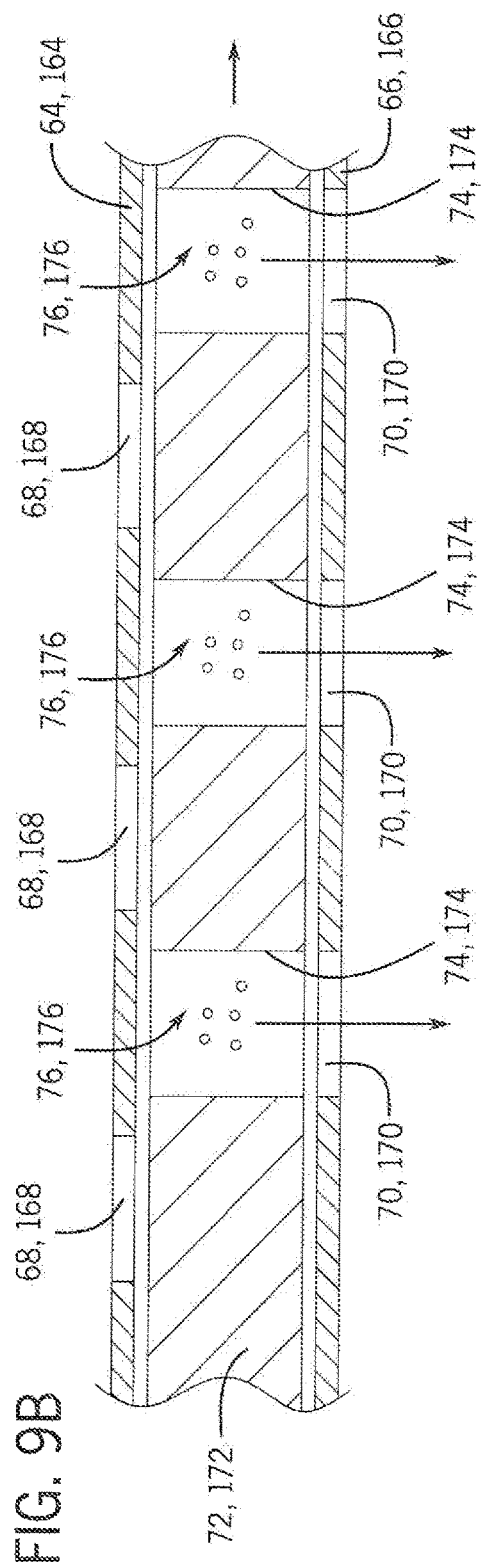

LIVESTOCK FEEDER WITH MEASURED DISPENSING SYSTEM

FIELD OF THE INVENTION

The present invention relates generally to livestock feeders, and in particular, to a livestock feeder with a measured dispensing system for use in feeding hay and grains to livestock.

BACKGROUND AND SUMMARY OF THE INVENTION

Livestock feeders are intended for feeding livestock such as cattle, sheep, swine and horses in an agricultural setting. These types of feeders assist in dispensing large quantities of feed, for example, hay and grains, to livestock several times a day. On average, cattle are fed twice to five times a day and may consume as much as 25-30 pounds of feed per day. The task of feeding livestock is a laborious and time-consuming chore for many livestock owners.

Many livestock feeders provide high capacity storage tanks which can receive and store large amounts of feed prior to feeding. A storage tank may connect to a single trough so that the stored feed therein may dispense into the trough for animal consumption. However, the amount of feed delivered to the trough at a given feeding is generally not monitored. Moreover, when multiple cattle feed from the same trough, there may be unequal consumption between cattle, especially when stronger cattle push weaker cattle away from the feeder or exhibit "bulling" behavior.

For certain livestock breeding or livestock shows, the amount fed to the cattle must be strictly monitored. As such, there is a need for measured food delivery to each head of cattle in a manner which allows the livestock owner to monitor the amount of feed fed to each cattle and prevents "bulling" behavior during feedings.

Therefore, it is a primary object and feature of the present invention to provide a livestock feeder providing pre-measured feeding of livestock so that the amount of feed fed to each cattle may be monitored.

It is a further object and feature of the present invention to provide a livestock feeder that provides equal consumption between cattle by separating the feeding of cattle into stalls.

It is still further an object and feature of the present invention to provide a livestock feeder that attract the animal to the feeder and prevents the animal from being distracted by other animals during feeding.

In accordance with the present invention, a livestock feeder having a hopper defining a chamber for receiving livestock feed therein and a feed discharge assembly operatively connected to the hopper is provided. The feed discharge assembly includes a top plate providing a plurality of first openings communicating with the hopper for receiving the livestock feed therein, a bottom plate providing a plurality of second openings misaligned from the first openings, and a center plate positioned between the top plate and the bottom plate and including a plurality of receptacles, the center plate moveable between a first position wherein each receptacle is configured for receiving feed through the first openings and a second position where each receptacle is configured to discharge the feed received therein to corresponding second openings. The livestock feeder further includes a trough in communication with the second openings in the bottom plate of the feed discharge assembly, the trough adapted to receive feed discharged from the second openings.

The trough may include dividers for sectioning the trough into individual stalls, each stall aligned with and communicating with a corresponding one of the second openings in the bottom plate of the feed discharge assembly. Each stall is defined by a rear wall in communication with a corresponding one of the second openings in the bottom plate of the feed discharge assembly and a pair of spaced dividers extending therefrom, the dividers configured to block peripheral vision of an animal when the animal is feeding from the trough. An indicator light may be installed within each stall, each indicator light selectively emitting a light for attracting the livestock to the feeder. The light emitted by the indicator is one of a blue and a yellow light. A calf guard may be removeably attached to the livestock feeder and limiting physical access to the trough by an animal. The feeder may include a radio-frequency identification (RFID) reader. The RFID reader is configured to read a corresponding RFID identifier implanted in an animal when an animal is feeding from a stall of the trough.

The hopper may be cylindrical and the top plate, bottom plate and middle plates may be rings. Alternatively, the hopper may be rectangular and the top plate, bottom plate and middle plates may be rectangular. The hopper may also include a generally conical floor. The floor of the hopper directs the livestock feed towards the first openings in the top plate. A drive mechanism may be operatively connected to the center plate of the feed discharge assembly. The drive mechanism selectively moves the center plate between the first and second positions.

In accordance with a further aspect of the present invention, a method of feeding livestock is provided. The method includes the steps of filling a hopper with livestock feed and directing the feed towards a feed discharge assembly. The feed discharge assembly is moveable between a first position for receiving a quantity of feed from the hopper and a second position wherein the quantity of feed is discharged into a trough. The feed discharge assembly may be selectively moved between the first position to the second position.

The method may further include dividing the trough into a plurality of stalls. Each stall receives a portion of the quantity of feed with the feed discharge assembly in the second position. One of a blue light and yellow light may be emitted from at least one of the plurality of stalls when the feed discharge assembly is moved to the second position. It is contemplated to identify an animal feeding at a trough and record an identity of the animal for future reference. The feed discharge assembly may be rotatably moveable between the first and second positions or it may be linearly moveable between the first and second positions. The method may further include blocking the peripheral vision of an animal when the animal is feeding at the trough.

BRIEF DESCRIPTION OF THE DRAWINGS

The drawings furnished herewith illustrate a preferred construction of the present invention in which the above aspects, advantages and features are clearly disclosed as well as others which will be readily understood from the following description of the illustrated embodiments.

In the drawings:

FIGS. 9A and 9B are schematic diagrams of the feed discharge assembly of the livestock feeder of the present invention in a first state and a second state, respectively.

DETAILED DESCRIPTION OF THE INVENTION

Figure 1:
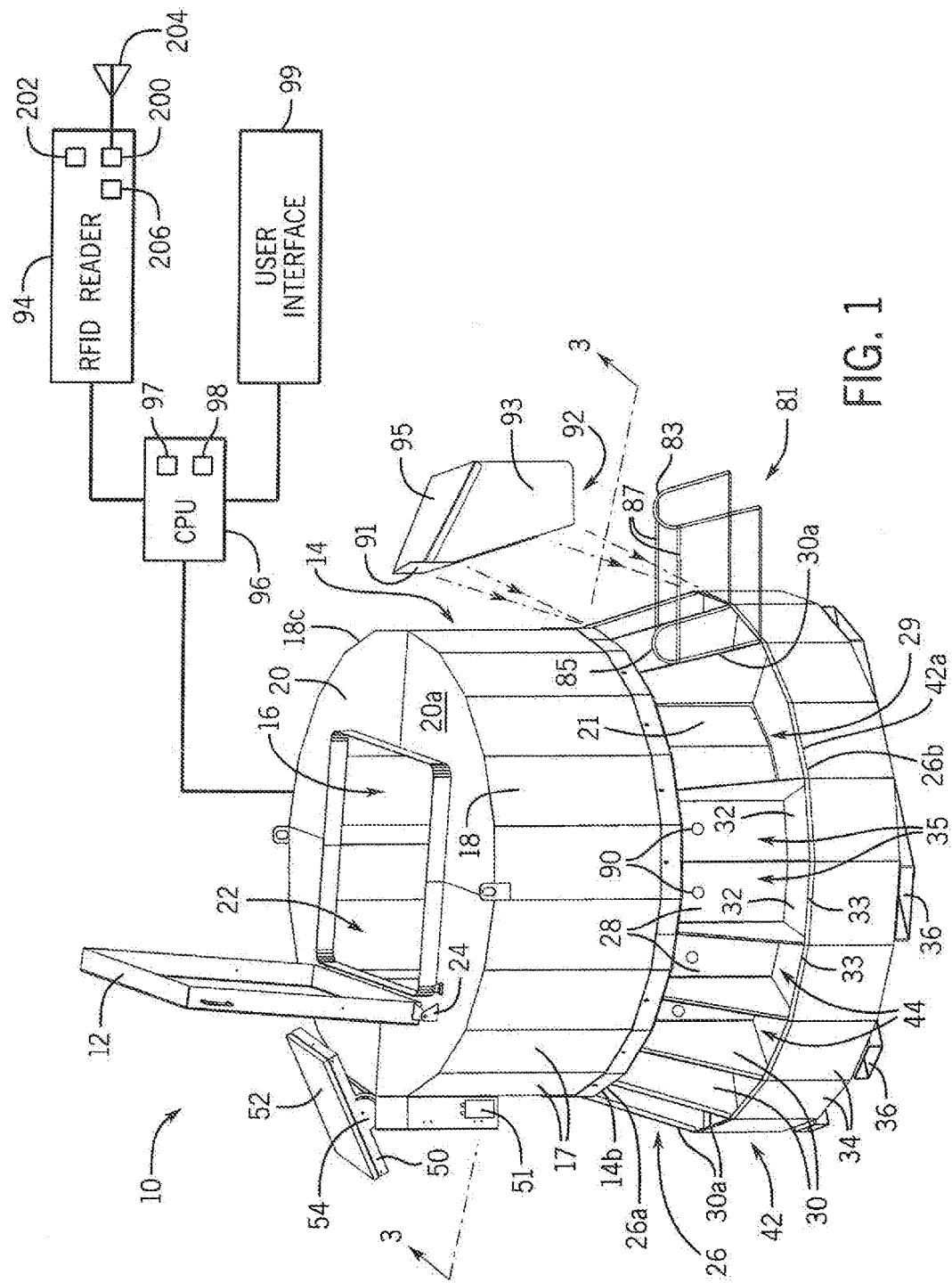
FIG. 1 is an isometric view of the livestock feeder in accordance with the present invention.

Referring to FIG. 1, a livestock feeder in accordance with the present invention is generally designated by the reference numeral 10. Livestock feeder 10 includes a hatch 12 or door providing access to a cylindrical hopper 14. The cylindrical hopper 14 includes, a plurality of adjacent walls 17 defining a curved, vertically extending sidewall 18. Sidewall 18 extends about a perimeter of a cylindrical volume 16. Upper edge 18c of sidewall 18 is closed by a generally circular top wall 20 which defines a ceiling of the cylindrical volume 16.

The top wall 20 substantially encloses the top of the cylindrical volume 16 and includes an opening 22 formed therein. Hatch 12 is pivotably connected to top wall 20 to provide access to the interior of cylindrical volume 16. By way of example, hatch 12 may be connected to the upper surface 20a of top wall 20 by a hinge 24 attached thereto. It is intended for the shape of the hatch 12 to generally correspond with the shape of the opening 22 and may be, for example, a rectangular hatch 12 enclosing a rectangular opening 22. However, it is contemplated that the hatch 12 and opening 22 may be any size or shape, such as round or circular, without deviating from the scope of the present invention. The hatch 12 is moveable between a first closed position wherein hatch 12 seals the interior of the cylindrical hopper 14 and a second open position wherein access to the cylindrical volume 16 is allowed through opening 22. It is contemplated to provide a door gasket or other sealing material about the periphery of opening 22 to facilitate the sealing between the hatch 12 and the top wall 20.

The curved vertical sidewall 18 and top wall 20 of the cylindrical volume 16 may further incorporate an insulating material so as to retain heat or cooling air within the volume 16 and to prevent heat or cooling air from escaping. The curved vertical sidewall 18 and top wall 20 of the cylindrical volume 16 may further be constructed of a stainless steel material so as to be resistant against the environmental elements, such as rain, wind, and debris, and durable enough to withstand damage caused by the livestock.

Trough 26 supports the cylindrical hopper 14 thereon and communicates with the interior of the cylindrical hopper 14 to receive feed. A lower edge 14b of the cylindrical hopper 14 rests upon an upper edge 26a of the trough 26 to support the hopper 14 thereon. The trough 26 includes a curved vertically extending back sidewall 28. A plurality of partitions 30 or dividers extend outwardly forward from the curved back sidewall 28. The partitions 30 are spaced apart so as to section the trough 26 into individual stalls 44. The partitions 30 are generally triangular shaped wall portions to provide an oblique front edge 30a. Lower edges of the back sidewall 28 and partitions 30, respectively, are closed by a generally rectangular bottom wall 32 which defines a floor of the trough 26. The individual stalls 44 formed by the back sidewall 28, partitions 30, and bottom wall 32 provide feeding volumes 35 for holding or containing livestock feed. The bottom wall 32 may also include a rim 33 or lip extending upwardly from a front edge 32a of the bottom wall 32 to help retain the contents of the trough 26 therein and prevent the livestock feed from accidently spilling out. The back sidewall 28 includes an opening 29 formed therein. A door 21 may be provided over the opening 29 in the back sidewall 28 to provide access to the interior of the cylindrical volume 16.

Figure 3:
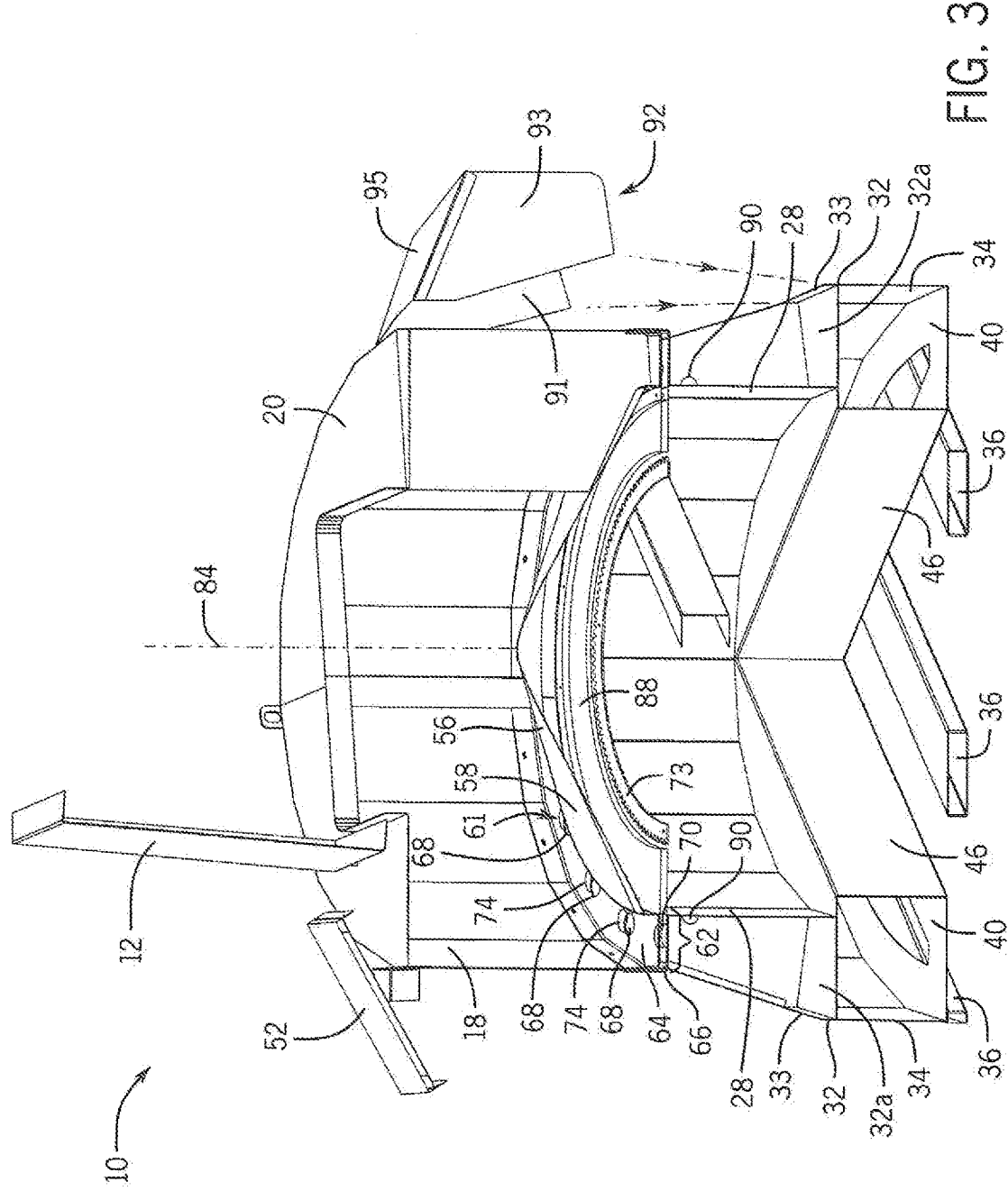
FIG. 3 is a cross sectional of the livestock feeder of the present invention taken along line 3-3 of FIG. 1.

Referring also to FIG. 3, base 42 supports the cylindrical trough 26 thereon. The lower edge 26b of the cylindrical trough 26 rests upon a top edge 42a of the base 42. The base 42 includes a curved, vertically extending front wall 34 joined on its bottom edge by a bottom wall 40, extending rearward from the front wall 34. A rear wall 46 is joined to the rear edges of the bottom wall 32 and bottom wall 40 to form a back wall of the base 42.

A number of supporting beams 36 disposed below the base 42 of the livestock feeder 10 may support the livestock feeder above the ground by providing vertical elevation to the livestock feeder 10. For example, three equally spaced beams 36 may extend along the bottom of the feeder 10 to elevate the bottom wall 40 above the ground. The beams 36 may be coupled to the bottom wall 40 or may be positioned beneath the feeder 10 but not attached to the bottom wall 40. According to one embodiment of the present invention, the beams 36 may be replaced with supporting feet extending down from the bottom wall 40 where the supporting feet are adjustable and equally spaced on the exterior surface of the bottom wall 40.

One or more indicator lights 90 may be optionally installed on the livestock feeder 10. The lights 90 may be mounted on the back sidewall 28 of each individual stall 44 or within or near each individual stall 44. The indicator lights 90 may be incandescent, LED, fluorescent, compact fluorescent or halogen bulbs which emit light which is visible to the feeding livestock. For example, the indicator lights may emit yellow and/or blue light, which is visible to cattle. The indicator lights 90 will attract the cattle to the individual stalls 44 when it is time for feeding. The indicator lights 90 may be connected to and operated by a central processing unit (CPU) 96 having a processor 97 and executing a computer program stored in memory 98 and providing signals to toggle the indicator lights between an on condition and an off condition on a predetermined time schedule. The CPU 96 may be operatively connected to a user interface 99 to allow the user to program and control the operation of the indicator lights 90. It is contemplated that the indicator lights 90 may be operated without communicating with the CPU 96, and may be turned on and off manually, for example, by a switch.

A radio-frequency identification (RFID) reader 94 may be installed on the livestock feeder 10. The RFID reader 94 generally provides a transmitter 200, a receiver 202, and a power assembly 206 for powering the transmitter 200 and receiver 202. The power assembly 206 may be an internal battery 51 or generator of the livestock feeder 10, or may be external to the livestock feeder 10 and provided via a cable or cord. The CPU 96 is connected to the transmitter 200, receiver 202, and power assembly 206 to control operation thereof. The transmitter 200 may generate a radiofrequency (RF) signal which is directed through one or more antennas 204 to interrogate a RFID identifier, microchip, tag or transponder implanted in the feeding livestock. The receiver 202 receives and processes the reply signals from the RFID identifier. The RFID reader 94 may provide a positive identification of an animal when it is in close proximity to the livestock feeder 10 and feeding from the feeding volumes 35. The RFID reader 94 allows the user to identify which livestock are feeding and/or how many times the livestock has entered the stall 44 or trough 26 for feeding in a designated amount of time. The identity of the animal and feeding data such as date and time of feeding may be recorded and stored in memory 98 of the CPU 96 for future reference.

A panel 50 covered by a solar cell 52 to be exposed to the receipt of solar radiation for the generation of electrical power may optionally power the livestock feeder 10. A hinge 54 coupled to an outer surface of the feeder 10 allows the solar panel 50 to be angled to permit the solar cell 52 to be directed at an average elevation of the sun. The solar energy received by the solar cell 52 may be stored within a battery 51, such as a 12-volt DC battery, so that the power can be stored for later use. The solar energy may be used, for example, to power the indicator lights 90, RFID reader 94, or to operate the feed assembly 61, to be further discussed herein.

Vision guards 92 may be installed over the openings of the feeding volumes 35, for example, by bolts, to optionally block the peripheral vision of the feeding animals. The vision guards 92 provide a horizontally extending top wall 95, connected on its left and right edges by left 93 and right 91 walls, respectively, extending vertically downward from the top wall 95. The walls of the vision guards 92 extend outward from the feeding volumes 35 to block the peripheral vision of the animal so that the animal is not distracted by other animals during feeding.

Calf guards 81 may optionally be installed over the openings of the feeding volumes 35 to allow only smaller sized animals to enter the stalls 44 and feed from a particular feeding volume 35. Calf guards 81 provide a frame assembly with an inverted U-shaped front bar 83 disposed opposite an inverted U-shaped rear bar 85 and connected therebetween by a plurality of horizontally extending bars 87. The rear bar 85 is removeably attached to the front opening of the feeding volume 35 so that the front bar 83 extends outwardly therefrom. The front bar 83 restricts the height and width of an animal allowed to approach the feeding volume 35 whereas a smaller animal may clear the U-shaped restrictions of the front bar 83 and feed from the feeding volume 35. The calf guards 81 may be selectively installed on only a portion of the stalls 44 in order to provide selective feeding stalls 44 for smaller animals.

Figure 2:
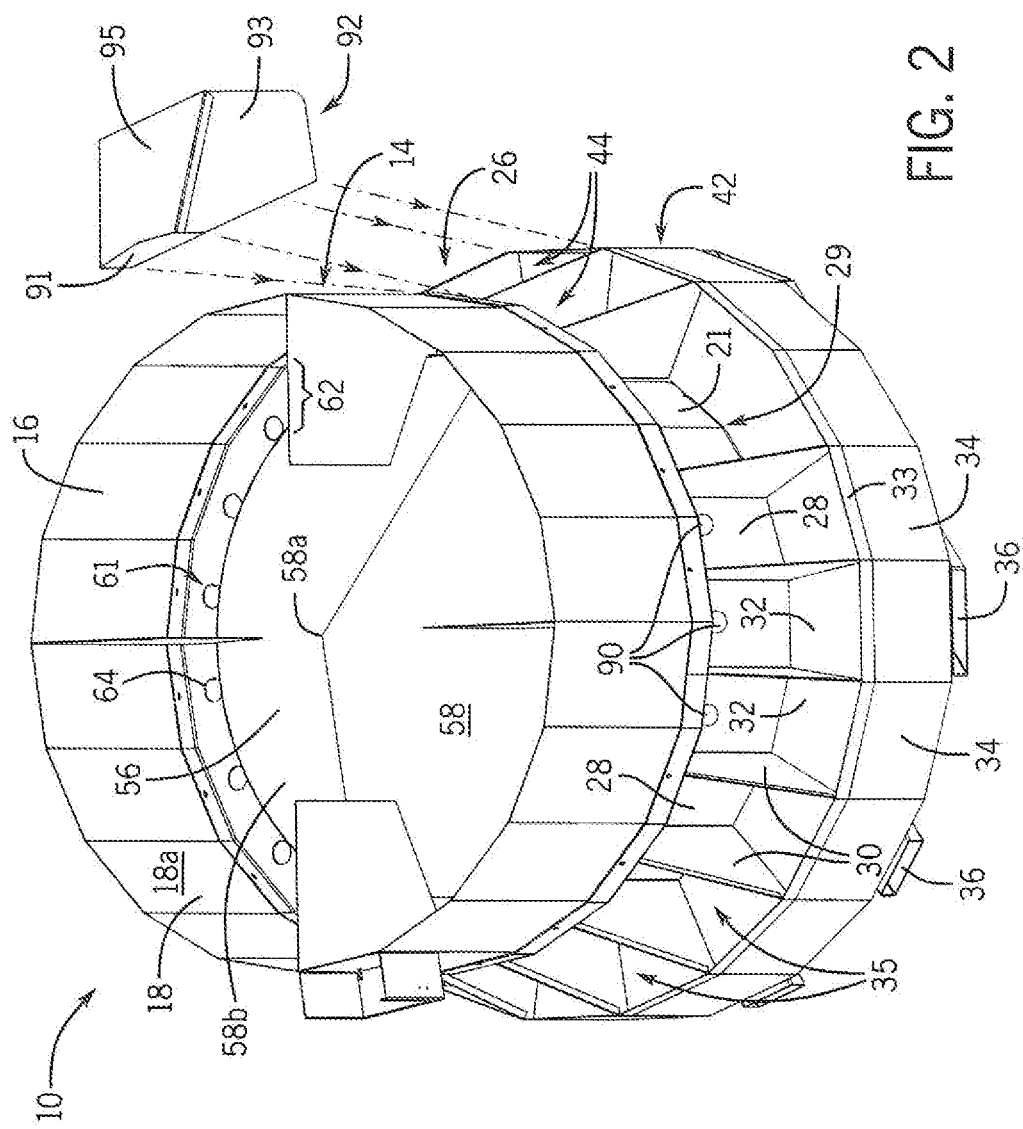
FIG. 2 is a top isometric view of the livestock feeder of FIG. 1 showing a top of the hopper removed and revealing a feed discharge assembly.

Referring to FIGS. 2 and 3, the interior of cylindrical volume 16 allows storage of livestock feed therein. The hatch 12 is moved from the first closed position to the second open position to allow the feed to be loaded into the interior of cylindrical volume 16. The hatch 12 may be returned to the closed position after the feed is deposited within the hopper 14 to seal the cylindrical volume 16. The cylindrical volume 16 provides a volume that can hold approximately 5,000-8,000 pounds of livestock feed at one time.

The cylindrical hopper 14 contains therein a conical deflector 56 which defines a conically tapered floor of the interior of the cylindrical volume 16. The conical deflector 56 is generally formed by a curved surface 58 forming a cone shape therein, An apex of the deflector 56 is defined by a point 58a or blunted point tapering downward and outward from the point 60 toward the inner surface 18a of the wall 18 of the cylindrical volume 16 to form a base 58b The base 58b of the conical deflector 56 has a generally smaller diameter than the diameter formed by the cylindrical volume 16 to leave a gap 62 between the base 58b of the conical deflector 56 and the inner surface 18a of outer sidewall 18 of the volume 16.

Figure 4:
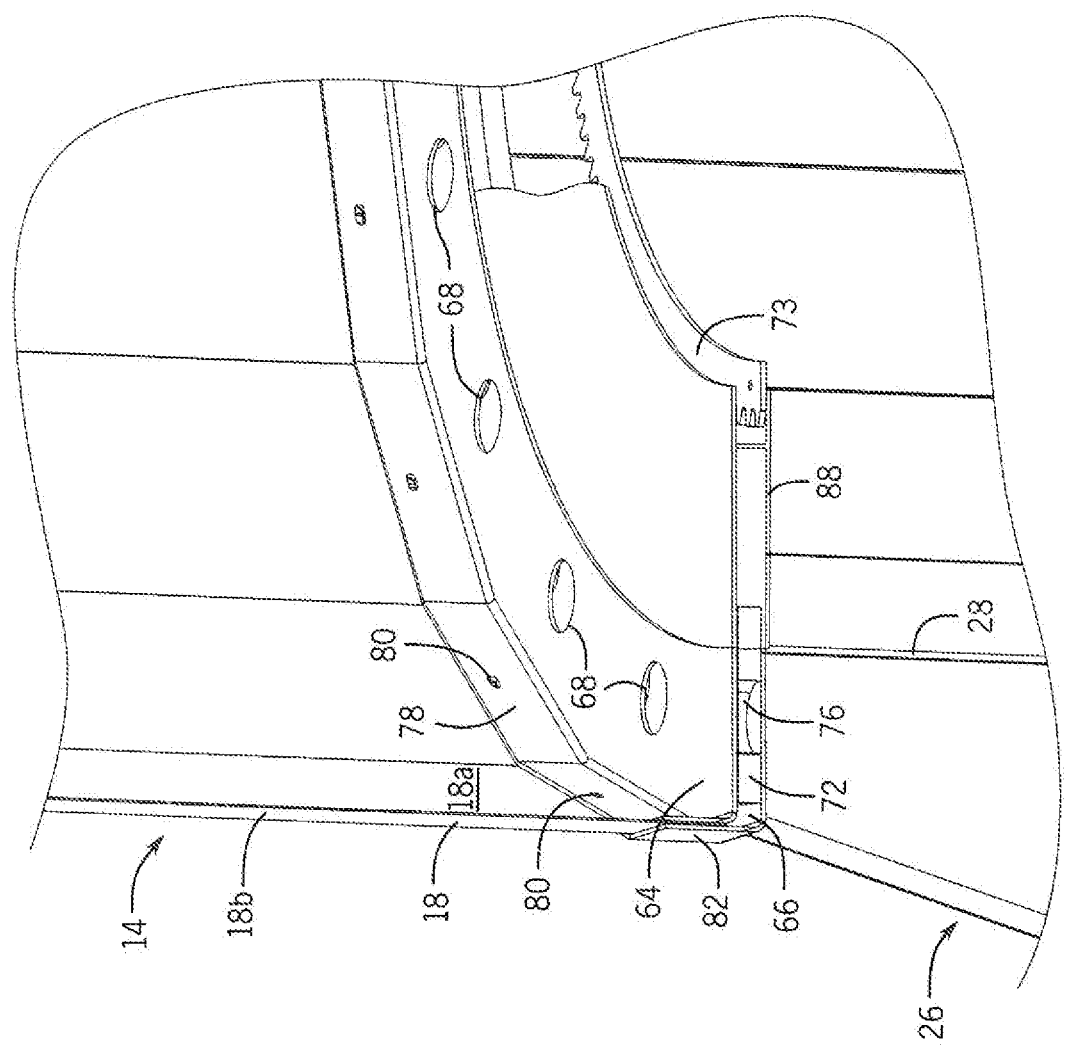
FIG. 4 is an enlarged view of the livestock feeder of FIG. 3 showing a rotatable feed plate flanked by top and bottom plates with dispensing holes.

Referring to FIG. 4, the conical deflector 56 directs the feed within the cylindrical volume 16 downward and outward toward a feed assembly 61 held within the gap 62 between the conical deflector 56 and the outer sidewall 18. The feed assembly 61 includes an upper ring 64 extending horizontally about a perimeter of the cylindrical volume 16 and parallel to a lower ring 66 also extending horizontally about a perimeter of the cylindrical volume 16. An approximately 1-3 inch or 1 inch space is provided between the upper ring 64 and lower ring 66. The upper ring 64 and lower ring 66 may be made of a stainless steel or similar material.

The upper ring 64 provides a radial wall thickness of approximately 6-10 inches, or preferably, 8 inches and a ring width of approximately ⅛ inches or 11 gauge. The inner diameter of the upper ring 64 generally corresponds with the outer diameter formed by the base 58b of the conical deflector 56. The outer circumference of the upper ring 64 provides a flange 78 extending upwardly from the outer circumference of the ring 64 and which facilitates mounting of the ring 64 to the inner surface 18a of the sidewall 18 by a plurality of fasteners 80.

Lower ring 66 extends below and parallel to the upper ring 64, extending around a perimeter of the cylindrical volume 16. The lower ring 66 may provide a radial wall thickness of approximately 6-10 inches, or preferably, 8 inches and a ring width of approximately ⅛ inches or 11 gauge. The inner diameter of the lower ring 66 generally corresponds with the diameter formed by the base 58b of the conical deflector 56. The outer circumference of the lower ring 66 provides a flange 82 extending upwardly from the outer circumference of the lower ring 66 and facilitating mounting of the ring 66 to an outer surface 18b of the sidewall 18 by a number of fasteners 80. It is contemplated that the flange 82 could also be mounted to the inner surface 18a of the sidewall 18 in a similar manner. It is also contemplated that the upper 64 and lower 66 rings may be mounted within the cylindrical volume 16 in a number of different manners such as welding to sidewall 18, or mounted to a different surface within the cylindrical volume 16.

A first set of holes 68, approximately 1-3 inches or 2 inches in diameter, are provided in and generally centered along the ring width of the upper ring 64. The holes 68 are spaced approximately 10-16 inches apart or 12 inches apart from each other along a circumference of the upper ring 64. A second set of holes 70, approximately 1-3 inches or 2 inches in diameter, are provided in and generally centered along the ring width of the lower ring 66. The holes 70 are spaced approximately 10-16 inches apart or 12 inches apart along a circumference of the lower ring 66. The first set of holes 68 and second set of holes 70 are misaligned so that the first set of holes 68 do not vertically align with the second set of holes 70. Holes 68 of the upper ring 64 may be distanced approximately 0-8 inches from the adjacent holes 70 of the lower ring 66 when measured about the circumference of the rings 64, 66.

The feed assembly 61 provides an inner ring 72 positioned between the upper ring 64 and lower ring 66. The inner ring 72 provides a substantially solid ring with a ring width generally corresponding to but slightly less than the distance between the upper ring 64 and lower ring 66 so as to allow movement therebetween. For example, the inner ring 72 may have a ring width of approximately 1-3 inches or 1 inch and a radial wall thickness of approximately 6-10 inches or 8 inches. The inner ring 72 may be made of a durable plastic, such as high-density polyethylene (HDPE). Disposed within the ring 72 are a plurality of holes 74, approximately 1-3 inches or 2 inches in diameter and forming receptacles 76 or containers within the inner ring 72. The receptacles 76 may hold approximately ¼ to 1 lb. of livestock feed.

Referring to FIGS. 9A and 9B, the inner ring 72 is rotated between the stationary upper ring 64 and stationary lower ring 66 thus aligning the receptacles 76 with the first set of holes 68 of the upper ring 64 in a first position, FIG. 9A, and aligning the receptacles 76 with the second set of holes 70 of the lower ring 66 in a second position, FIG. 9B. As will be explained further herein, in the first position, the receptacles 76 are configured for receiving feed through the first set of holes 68 and in the second position, the receptacles 76 are configured to discharge the feed received therein out through the second set of holes 70.

The inner ring 72 is mounted for rotation about an axis 84 as securably attached to a ring gear 88 rotating with a central drive gear 73 ultimately driven by a permanent magnet reversible DC electric motor (not shown) so that the DC electric motor may generate sufficient torque to rotate the inner ring 72. The DC electric motor may be powered by a DC battery 51 charged by the solar panel 50 or by an AC power system. The motor may be operably controlled by the CPU 96. The CPU 96 may operate the motor to automatically start and stop the motor, select forward or reverse rotation, select and regulate the speed, and regulate or limit the torque of the motor according to a program stored in memory 98 of the CPU 96. Alternatively, operation of the motor may be operated without a program stored in the CPU 96 and may be manually activated. It is also contemplated that the inner plate 172 may be moved between the first and second positions by any known drive mechanism, such as a hand drive mechanism.

Referring again to FIG. 3, the second set of holes 70 of the lower ring 66 are positioned above the trough 26 such that feed may be discharged downward into the trough 26 and into the feeding volumes 35 of the plurality of stalls 44. One hole 70 generally corresponds with a single stall 44 such that feed that is dispensed through a single hole 70 falls into the feeding volume 35 of an individual stall 44. It is also understood multiple holes 70 may dispense into an individual stall 44 to increase the speed of feed delivery into the feeding volume 35. The feed dispensed into the feeding volume 35 may be accessed by the livestock for consumption.

In operation, feed is deposited into the cylindrical hopper 14 and held within the cylindrical volume 16 until feeding time. When it is time for feeding, the central drive gear 73 drives the ring gear 88 to rotate the inner ring 72 between the first position, FIG. 9A, in which the receptacles 76 are aligned with the first holes 68, and the second position, FIG. 9B, in which the receptacles 76 are aligned with the second holes 70. The inner ring 72 is generally operated by rotating the inner ring 72 in a back and forth manner so that the receptacles 76 rotate in one direction to the first position and rotate in an opposite direction to the second position. In this respect, the receptacles 76 rotate between the same first 68 and second 70 holes of the upper ring 64 and lower ring 66, respectively. However, the inner ring 72 may also be operated so that the inner ring 72 is rotated in one direction about axis 84 so that the receptacles 76 alternate between the first 68 and second 70 holes while rotating about a circumference of the upper ring 64 and lower ring 66.

In the first position, FIG. 9A, feed drops from the cylindrical volume 16 through the first holes 68 and into the receptacles 76. Then, the inner ring 72 rotates to the second position, FIG. 9B, where the feed drops from the receptacles 76 through the second holes 70 and into the feeding volume 35 of the stall 44 therebelow. The inner ring 72 repeats the process of rotating between the first position and the second position until the desired volume of livestock feed is delivered into the feeding volume 35.

At or around the time that the livestock feed is delivered to the feeding volumes 35, the indicator lights 90 may emit the light to attract the livestock to the stalls 44 for feeding. The partitions 30 are generally sized to allow feeding by one animal at a time at each stall 44. It is contemplated that the interval between adjacent partitions 30 may be approximately as wide as an animal's head and/or shoulder width. While the animal is feeding, other livestock are not able to feed from the same stall 44, thus the amount of livestock feed dispensed to a particular animal is monitored and controlled.

The RFID reader 94 may be used to identify the livestock feeding from the feeder 10 and monitor the frequency of their feedings, their feeding habits, and to identify healthy or sick animals.

Figure 5:
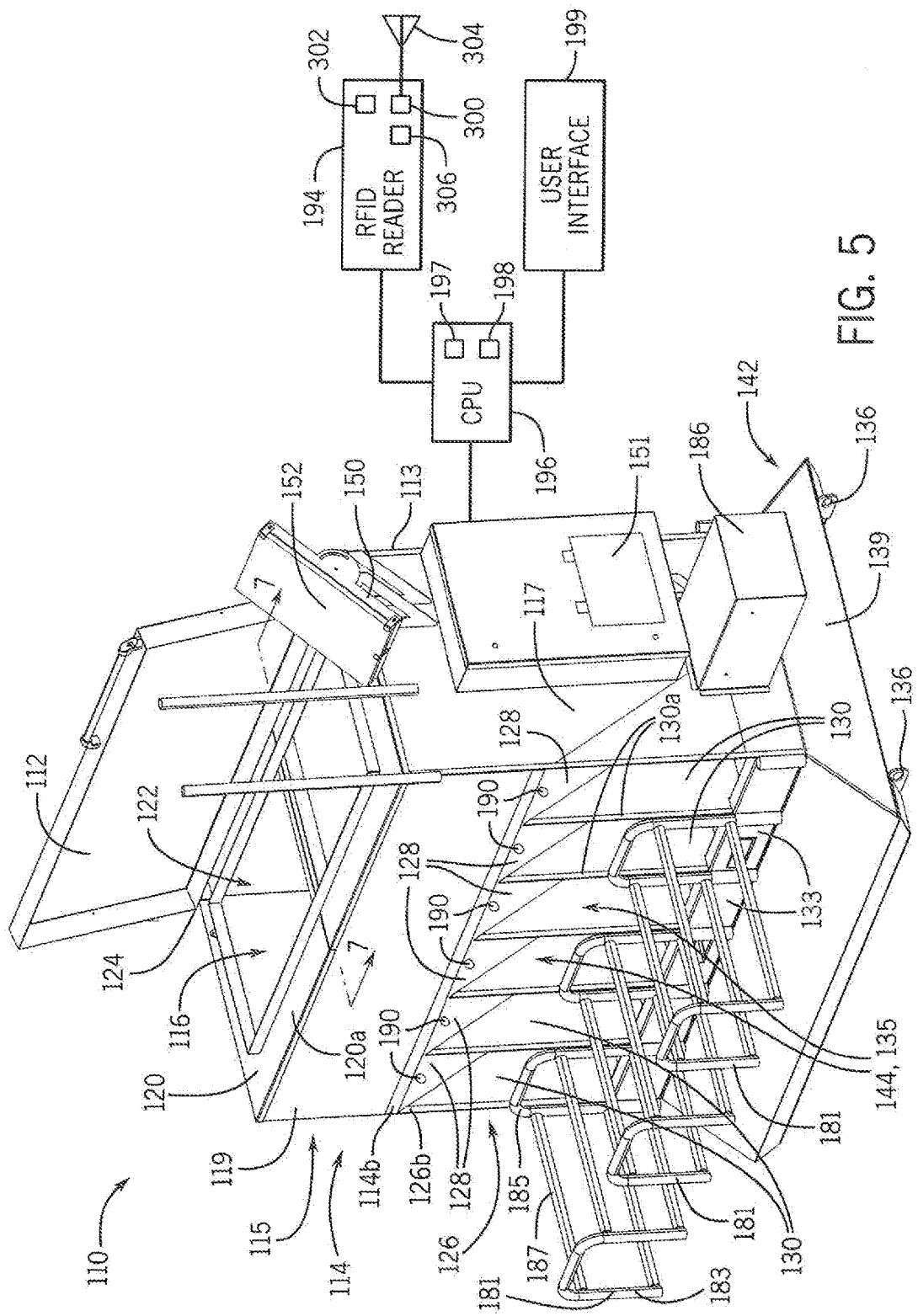
FIG. 5 is an isometric view of an alternate embodiment of a livestock feeder in accordance with the present invention.

Referring now to FIG. 5, a livestock feeder in accordance with an alternative embodiment of the present invention is generally designated by the reference numeral 110. Livestock feeder 110 provides a generally linear configuration instead of a circular configuration of the previous embodiment. Elements of the livestock feeder 110 of this embodiment that correspond to the livestock feeder 10 of the first embodiment are designated by the same reference numeral, incremented by 100. A description of many of these elements is abbreviated or even eliminated in the interest of brevity.

The livestock feeder 110 includes a hatch 112 or door providing access to a rectangular hopper 114. The rectangular hopper 114 includes a plurality of adjacent walls defining a generally rectangular enclosure. The plurality of walls include a vertically extending back sidewall 113 joined on its left and right edges by vertically extending left 115 and right 117 side walls extending forward from the back sidewall 113 and joined at their front edges by a front wall 119. The walls 113, 115, 117, 119 extend about a perimeter of rectangular volume 116. At least one of the sidewalls 115, 117 includes an opening 129. A door 121 is pivotably connected to at least one of the sidewalls 115, 117 to provide access to the rectangular volume 116, for example, for maintenance through the opening 129. Upper edges of the back wall 113, side walls 115, 117, and front wall 119, respectively, are closed by top wall 20 which defines a ceiling of the rectangular volume 116.

The top wall 120 substantially encloses the top of the cylindrical volume 116 and includes an opening 122 formed therein. Hatch 112 is pivotably connected to top wall 120 to provide access to the interior of rectangular volume 116. By way of example, hatch 112 may be connected to the upper surface 120*a* of top wall 120 by a hinge 124 attached thereto.

It is intended for the shape of the hatch 112 to generally correspond with the shape of the opening 122 and may be, for example, a rectangular hatch 112 enclosing a rectangular opening 122. However, it is contemplated that the hatch 112 and opening 122 may be any size or shape, such as round or circular shaped as well. The hatch 112 is moveable between a first closed position wherein hatch 112 seals the interior of the rectangular hopper 114 and a second open position wherein access to the rectangular volume 116 is allowed through opening 122. It is contemplated to provide a door gasket or other sealing material about the periphery of opening 122 to facilitate the sealing of the hatch 112 and the top wall 120.

The back wall 113, side walls 115, 117, front wall 119, and top wall 120 of the rectangular volume 116 may further incorporate an insulating material so as to retain heat or cooling air within the volume 116 and to prevent heat or cooling air from escaping. The back wall 113, side walls 115, 117, front wall 119, and top wall 120 of the rectangular volume 116 may further be constructed of a stainless steel material so as to be resistant against the environmental elements, such as rain, wind, and debris, and durable enough to withstand damage caused by the livestock.

Trough 126 supports the rectangular hopper 114 thereon. A lower edge 114*b* of the rectangular hopper 114 rests upon a top edge 126*a* of the trough 126 to be supported thereon. The trough 126 communicates with the rectangular hopper 114 to receive feed therefrom. The trough 126 provides two oppositely facing feeding areas, a front facing feeding area 141*a* and a rear facing feeding area 141*b*. Each feeding area 141*a*, 141*b* includes a forwardly angled back sidewall 128 joined at spaced intervals by a plurality of vertically extending partitions 130 extending forward from the back sidewall 128. The partitions 130 are spaced apart so as to partition the trough 126 into individual stalls 44. The partitions 130 are generally rectangular shaped wall portions to provide a straight front edge 130*a*. Lower edges of the back sidewall 128 and partitions 130, respectively, are closed by a generally rectangular bottom wall 132 which defines a floor of the trough 126. The individual stalls 144 formed by the back sidewall 128, partitions 130, and bottom wall 132 provide feeding volumes 135 for holding or containing livestock feed. The bottom wall 132 may also include a rim 133 or lip extending upwardly and outwardly from a front edge 32*a* of the bottom wall 132 to help retain the contents of the trough 126 therein and prevent the livestock feed from accidently spilling out.

Figure 7:
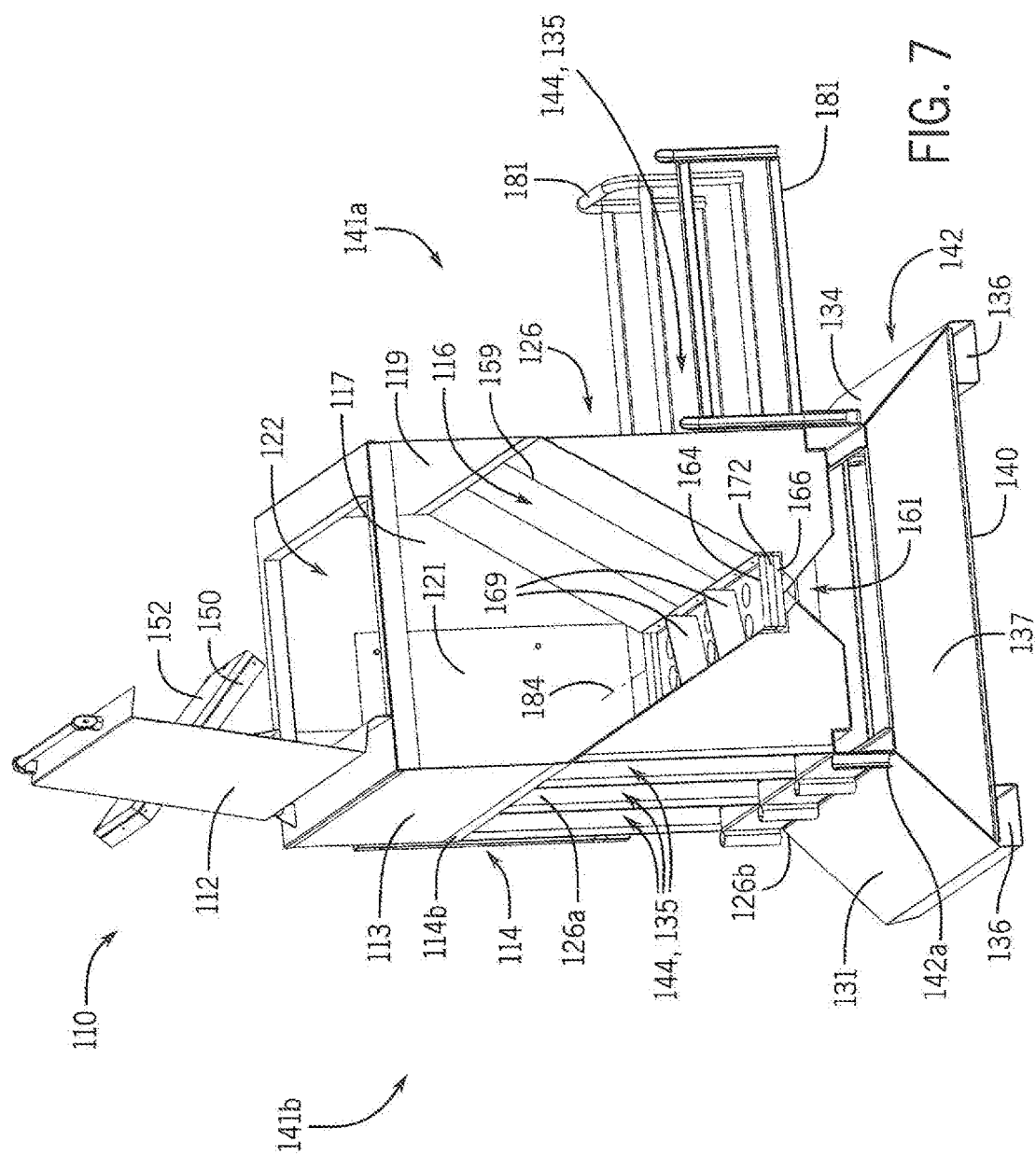
FIG. 7 is a cross sectional view of the livestock feed of the present invention taken along line 7-7 of FIG. 5.

Referring also to FIG. 7, base 142 supports the rectangular trough 126 thereon. The lower edge 126*b* of the rectangular trough 126 rests upon a top edge 142*a* of the base 142. The base 142 includes an angled front wall 134 and an angled rear wall 131 joined on their bottom edges, respectively, by a horizontally extending bottom wall 140, extending between the front wall 134 and rear wall 131. The left and right edges of the front wall 134 and rear wall 131 are joined by vertically extending left 137 and right 139 walls, respectively.

A plurality of supporting beams 136 may support the livestock feeder above the ground by providing vertical elevation to the livestock feeder 110. For example, a first beam 136 may extend along a front edge of the base 142 and a second beam 136 may extend along a rear edge of the base 142 to elevate the bottom wall 140 above the ground. The beams 136 may be coupled to the bottom wall 140 or may be positioned beneath the feeder 110 but not attached to the bottom wall 140. According to one embodiment of the present invention, the beams 136 may be replaced with support feet extending down from the bottom wall 140 where the support feet are adjustable and equally spaced on the exterior surface of the bottom wall 140.

The livestock feeder 110 may be optionally installed with a plurality of indicator lights 190 mounted on the back sidewall 128 of the individual stalls 144 or near each individual stalls 144. The indicator lights 190 may be incandescent, LED, fluorescent, compact fluorescent or halogen bulbs which emit light which is visible to the feeding livestock. For example, the indicator lights may emit yellow and/or blue light, which is visible to the cattle. The indicator lights 190 then attract the cattle to the individual stalls 144 when it is time of feeding. A central processing unit (CPU) 196 having a processor 197 and executing a computer program stored in memory 198 may provide signals to indicator lights 190 toggle the indicator lights 190 between an on condition and an off condition on a predetermined time schedule stored in memory 198. The CPU 196 may be operatively connected to a user interface 199 to allow the user to program and control the operation of the indicator lights 190. Alternatively, the indicator lights may be operated without communicating with the CPU 196, and may be turned on and off by a manual switch.

The livestock feeder 110 may be optionally powered by a solar panel as described above with respect to livestock feeder 10 and may also be optionally installed with a radio-frequency identification (RFID) reader as describe above with respect to livestock feeder 10. Vision guards 92, as heretofore described, may also be installed to the livestock feeder 110 to limit the peripheral vision of feeding animals. Calf guards 181, as described above, may also be installed onto the livestock feeder 110 to limit consumption from the feeder 110 to smaller animals at certain stalls 144.

Figure 6:
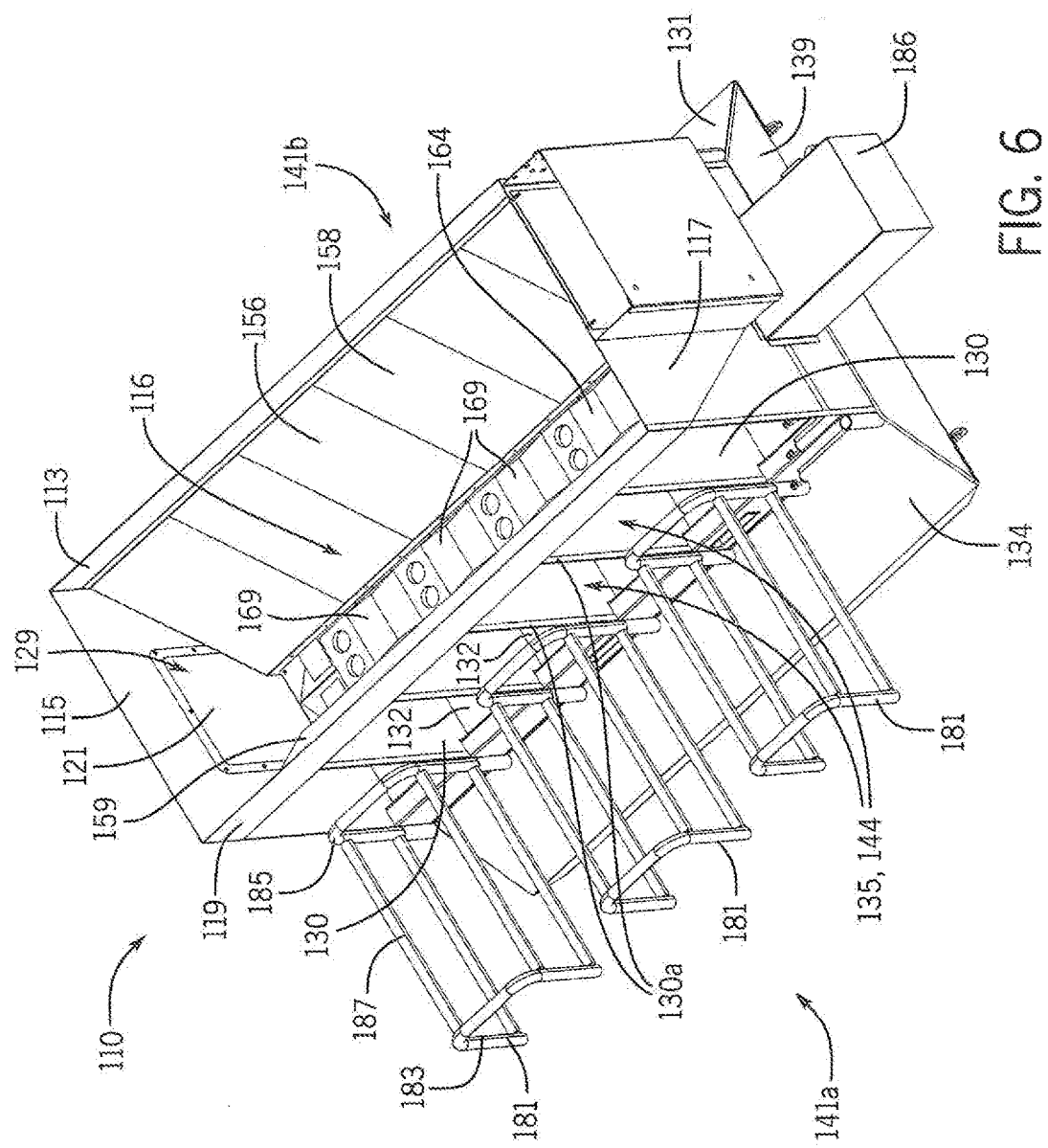
FIG. 6 is a top isometric view of the livestock feeder of FIG. 5 showing a top of hopper of the livestock feeder removed and revealing a feed discharge assembly.

Referring to FIGS. 6 and 7, the interior of rectangular volume 116 stores livestock feed therein. The hatch 112 is moved from the first closed position to the second open position to allow the feed to be loaded within the interior of the rectangular volume 116. The hatch 112 may be returned to the closed position after the feed is deposited within the hopper 114 to seal the rectangular volume 116. The rectangular volume 116 provides a volume that can hold approximately 3,000-5,000 pounds of livestock feed at one time.

The rectangular hopper 114 contains therein a deflector 156 which defines a tapered floor of the interior of the rectangular volume 116. The deflector 156 is formed by a first sheet 158 extending downward from the back wall 113 toward a center of the rectangular volume 116 and a second sheet 159 extending downward from the front wall 119 toward a center of the rectangular volume 116. The deflector 156 directs the feed toward a center of the rectangular volume 116 where a rectangular gap 162 is provided between the first sheet 158 and second sheet 159.

Figure 8:
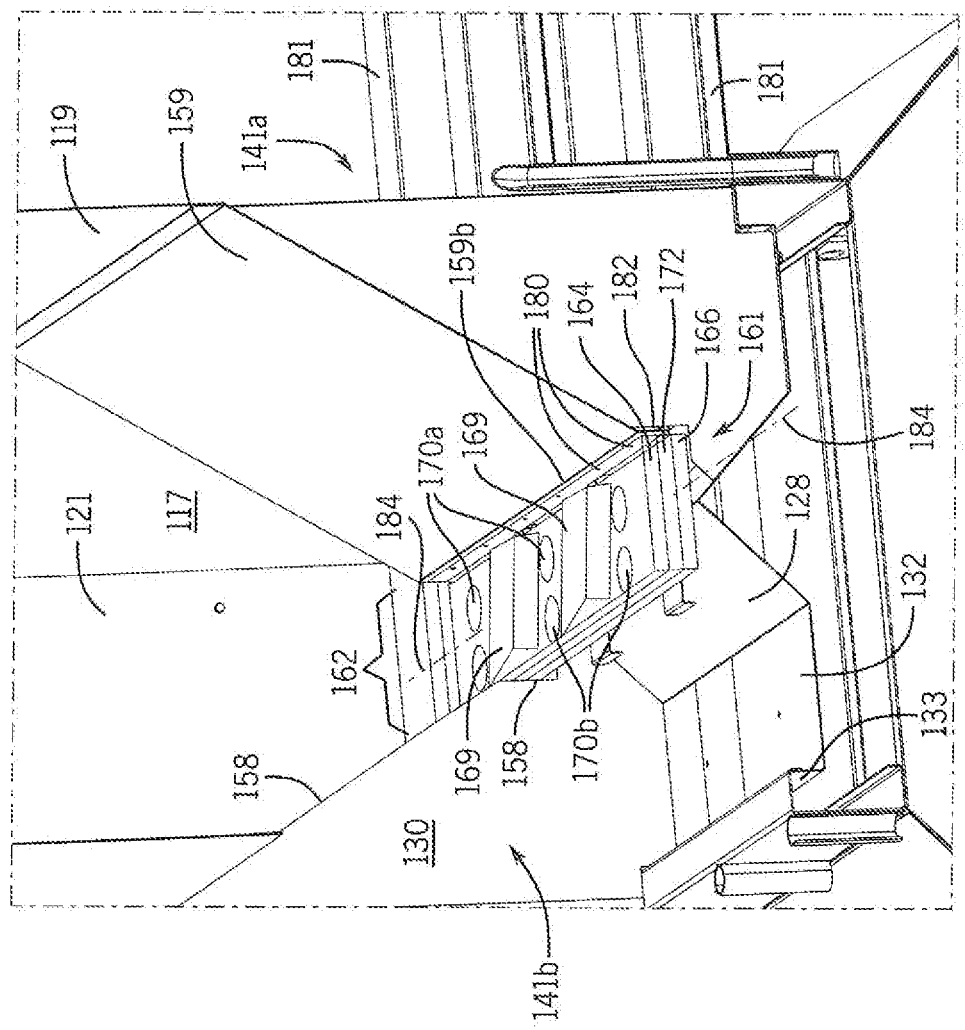
FIG. 8 is an enlarged view of the of the livestock feeder of FIG. 7 showing a rotating feed plate flanked by top and bottom plates with dispensing holes.

Referring to FIG. 8, the deflector 156 directs the feed within the rectangular volume 116 downward and inward toward a feed assembly 161 held within the gap 162 between the two deflector sheets 158, 159. The feed assembly 161 includes an upper plate 164 extending horizontally between the left 115 and right 117 sidewalls of the rectangular volume 116 parallel to a lower plate 166 also extending horizontally between the left 115 and right 117 sidewalls. An approximately 1-3 inches or 1 inch space is provided between the upper plate 164 and lower plate 166.

The upper plate 164 has a width that generally corresponds with the width of the gap 162 formed by the deflector 156, and the length of the upper plate 164 generally corresponds with the distance between the left 115 and right 117 sidewalls. A front and rear edge of the upper plate 164, respectively, include a flange 178 extending upwardly from the upper surface of the plate 164 and mounted to bottom ends 158b, 159b of the deflector sheets by a number of fasteners 180.

Lower plate 166 extends below and parallel to the upper plate 164, and extends between the left 115 and right 117 sidewalls of the rectangular volume 116. The width of the lower plate 166 generally corresponds with the width of the gap 162 formed by the deflector 156, and the length of the lower plate 166 generally corresponds with the distance between the left 115 and right 117 sidewalls. A front and rear edge of the lower plate 166, respectively, include a flange 182 extending upwardly from the upper surface of the lower plate 166 and mounted to bottom ends 158a, 159b of the deflector sheets by a number of fasteners 180. It is contemplated that the upper 164 and lower 166 plates may also be mounted within the rectangular volume 116 in a number of different manners such as welded or attached to another surface within the rectangular volume 116.

A first set of holes 168, approximately 1-3 inches or 2 inches in diameter, are provided in the upper plate 164. The holes 168 of the upper plate 164 are arranged in two parallel lines. Holes 168 running along each respective line are spaced approximately 10-20 inches apart or 16 inches apart along a length of the upper plate 164, and the holes 168 of opposite lines are spaced approximately 1-2 or 1 inch apart (from edge to edge) along a width of the upper plate 164. The holes 168 of opposite lines allow one line of holes 168 to dispense feed into feeding stalls 144 located on the front facing feeding area 141a and the other line of holes 168 to dispense feed into the rear facing feeding area 141b. Additional deflector plates 169 may be mounted onto the upper plate 164 to channel the feed downward toward the holes 168.

A second set of holes 170, approximately 1-3 inches or 2 inches in diameter, are provided in the lower plate 166. The holes 170 are arranged in two parallel lines. Holes 170 running along each respective line are spaced approximately 10-20 inches apart or 16 inches apart along a length of the lower plate 166, and the holes 168 of opposite lines are spaced approximately 1-2 or 1 inch apart (from edge to edge) along a width of the lower plate 166. The holes 170 of opposite lines allow one line of holes 170a to dispense feed into feeding stalls 144 located on the front facing feeding area 141a and the other line of holes 170b to dispense feed into the rear facing feeding area 1416b. The first set of holes 168 and second set of holes 170 are misaligned so that the first set of holes 168 do not vertically align with the second set of holes 170. Holes 168 of the upper plate 164 may be distanced approximately 0-10 inches from the adjacent holes 170 of the lower plate 166.

The feed assembly 161 provides an inner plate 172 positioned between the upper plate 164 and lower plate 166. The inner plate 172 provides a substantially solid board with a thickness corresponding to the width of the space between the upper plate 164 and lower plate 166. For example, the inner plate 172 may have a width of approximately 1-3 inches. Disposed within the plate 172 are a plurality holes 174, approximately 1-3 inches or 2 inches in diameter and forming receptacles 176 or containers within the inner plate 172. The receptacles 176 may hold approximately to ¼ to 1 lb. of livestock feed.

Referring to FIGS. 9A and 9B, the inner plate 172 is shifted back and forth between the upper plate 164 and lower plate 166 thus aligning the receptacles 176 with the first set of holes 168 of the upper plate 164 in a first position, FIG. 9A, and aligning the receptacles 176 with the second set of holes 170 of the lower plate 166 in a second position, FIG. 9B. The inner plate 172 is mounted for translation about an axis 184 as attached to an electric actuator 186. It is contemplated that the inner plate 172 may also be moved by any known drive mechanism, such as a motor or hand drive mechanism.

Referring again to FIG. 7, the second set of holes 170 of the lower plate 166 are positioned above the trough 126 such that feed may be dispensed downward into the feeding volumes 135 of the plurality of stalls 144. One hole 170 generally corresponds with a single stall 144 such that feed that is dispensed through hole 170 falls into the feeding volume 135 of an individual stall 144. It is also understood multiple holes 170 may dispense into an individual stall 144 to increase the speed of feed delivery. The feed within the feeding volume 135 may then be accessed by the livestock for consumption.

In operation, livestock feed is deposited into the rectangular hopper 114 and held within the rectangular volume 116 until feeding time. When it is time for feeding, the electric actuator 186 drives the inner plate 172 to shift the inner plate 172 between the first position, FIG. 9A, in which the receptacles 176 are aligned with the first holes 168 and the second position, FIG. 9B, in which the receptacles 176 are aligned with the second holes 170. The inner plate 172 is generally operated by shifting the inner plate 172 in a back and forth manner so that the receptacles 176 shift in one direction to the first position and shift in an opposite direction to the second position. In this respect, a single receptacle 176 shifts between the same first 168 and second 170 holes of the upper plate 164 and lower plate 166, respectively.

In the first position, FIG. 9A, feed drops from the rectangular volume 116 through the first holes 168 and into the receptacles 176. The inner plate 172 then moves to the second position, FIG. 9B, where the feed drops from the receptacles 176 through the second holes 170 and falls into the feeding volumes 135 of the stalls 144 therebelow of the front feeding area 141a and back feeding area 141b of the rectangular trough 126 simultaneously. The inner plate 172 may repeat the process of shifting between the first position and the second position until the desired volume of livestock feed is delivered to the feeding volume 135.

At or around the time that the livestock feed is delivered to the feeding volumes 135, the indicator lights 190 may emit light to attract the livestock to the stalls 144 for feedings as described above. An RFID reader 194 may be used to identify the livestock feeding from the feeder 110 and monitor the frequency of their feedings, their feeding habits, and to identify healthy or sick animals.

Various modes of carrying out the invention are contemplated as being within the scope of the following claims particularly pointing out and distinctly claim1ng the subject matter, which is regarded as the invention.

I claim:

1. A livestock feeder comprising:
a hopper defining a chamber for receiving livestock feed therein;
a feed discharge assembly operatively connected to the hopper, the feed discharge assembly including:
a top plate providing a plurality of first openings communicating with the hopper for receiving the livestock feed therein,
a bottom plate providing a plurality of second openings misaligned from the first openings, and a center plate positioned between the top plate and the bottom plate and including a plurality of receptacles, the center plate moveable between a first position wherein each receptacle is configured for receiving feed through the first openings and a second position wherein each receptacle is configured to discharge the feed received therein to corresponding second openings; and a trough in communication with the second openings in the bottom plate of the feed discharge assembly, the trough adapted to receive feed discharged from the second openings.

2. The feeder of claim 1, wherein the trough includes dividers for sectioning the trough into individual stalls, each stall aligned with and communicating with a corresponding one of the second openings in the bottom plate of the feed discharge assembly.

3. The feeder of claim 2, wherein each stall is defined by a rear wall in communication with a corresponding one of the second openings in the bottom plate of the feed discharge assembly and a pair of spaced dividers extending therefrom, the dividers configured to block peripheral vision of an animal when the animal is feeding from the trough.

4. The feeder of claim 2 further comprising an indicator light installed within each stall, each indicator light selectively emitting a light for attracting the livestock to the feeder.

5. The feeder of claim 4, wherein the light emitted by the indicator is one of a blue and a yellow light.

6. The feeder of claim 2 further comprising a calf guard removeably attached to the livestock feeder and limiting physical access to the trough by an animal.

7. The feeder of claim 2 further comprising a radio-frequency identification (RFID) reader, the RFID reader configured to read a corresponding RFID identifier implanted in an animal when an animal is feeding from a stall of the trough.

8. The feeder of claim 2, wherein the hopper is cylindrical.

9. The feeder of claim 8, wherein the top plate, bottom plate and middle plate are rings.

10. The feeder of claim 2, wherein the hopper is rectangular.

11. The feeder of claim 10, wherein the top plate, bottom plate and middle plate are rectangular.

12. The feeder of claim 2 wherein the hopper includes a generally conical floor, the floor of the hopper directing the livestock feed towards the first openings in the top plate.

13. The feeder of claim 1 further comprising a drive mechanism operatively connected to the center plate of the feed discharge assembly, the drive mechanism selectively moving the center plate between the first and second positions.

14. A method of feeding livestock form a livestock feeder comprising:
a hopper defining a chamber for receiving livestock feed therein; a feed discharge assembly operatively connected to the hopper, the feed discharge assembly including:
a top plate providing a plurality of first openings communicating with the hopper for receiving the livestock feed therein,
a bottom plate providing a plurality of second openings misaligned from the first openings, and
a center plate positioned between the top plate and the bottom plate and including a plurality of receptacles, the center plate moveable between a first position wherein each receptacle is configured for receiving feed through the first openings and a second position wherein each receptacle is configured to discharge the feed received therein to corresponding second openings; and
a trough in communication with the second openings in the bottom plate of the feed discharge assembly, the trough adapted to receive feed discharged from the second openings;
the method comprising the steps of:
filling the hopper with livestock feed;
directing the feed towards the feed discharge assembly, the feed discharge assembly moveable between the first position for receiving a quantity of feed from the hopper and the second position wherein the quantity of feed is discharged into the trough; and
selectively moving the feed discharge assembly from the first position to the second position.

15. The method of claim 14 comprising the additional step of dividing the trough into a plurality of stalls, each stall receiving a portion of the quantity of feed with the feed discharge assembly in the second position.

16. The method of claim 15 comprising the additional step of emitting one of a blue light and yellow light from at least one of the plurality of stalls when the feed discharge assembly is moved to the second position.

17. The method of claim 16 comprising the additional steps of identifying an animal feeding at a trough and recording an identity of the animal for future reference.

18. The method of claim 15 wherein the feed discharge assembly is rotatably moveable between the first and second positions.

19. The method of claim 15 wherein the feed discharge assembly is linearly moveable between the first and second positions.

20. The method of claim 15 comprising the additional step of blocking the peripheral vision of an animal when the animal is feeding at the trough.

* * * * *